United States Patent [19]

Capotorto

[11] Patent Number: 4,775,077

[45] Date of Patent: Oct. 4, 1988

[54] VITAMIN DISPENSER

[76] Inventor: Nicolo R. Capotorto, 119 Salem Ave., Port Charlotte, Fla. 33952

[21] Appl. No.: 18,434

[22] Filed: Feb. 25, 1987

[51] Int. Cl.[4] .................... B65G 59/00

[52] U.S. Cl. .................... 221/131; 221/198

[58] Field of Search .................... 221/131, 198, 197, 274, 221/265, 298; 222/557, 560

[56] References Cited

U.S. PATENT DOCUMENTS 2,239,196 4/1941 Lunvik .................... 221/131
2,923,436 2/1960 Koehn .................... 221/197
3,270,915 9/1966 Auer .................... 221/198
3,351,233 11/1967 Chanoul et al. .................... 221/131

*Primary Examiner*—Joseph J. Rolla
*Assistant Examiner*—Kenneth Noland
*Attorney, Agent, or Firm*—Leon Gilden

[57] ABSTRACT

A vitamin dispenser designed for home use may be hung on a wall and includes manual release levers for dispensing different types of vitamins when desired. The dispenser includes a plurality of slots for holding different types of vitamins, and viewing windows in the dispenser provide an indication as to when a particular type of vitamin should be refilled.

1 Claim, 2 Drawing Sheets

FIG 3
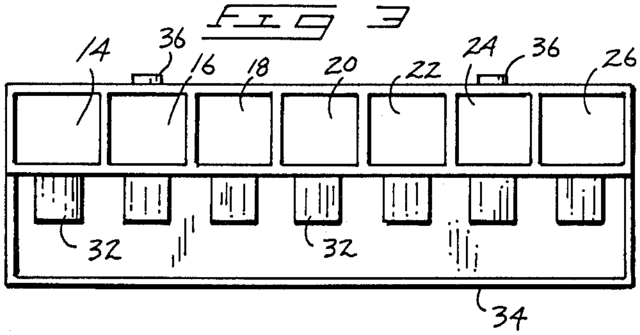
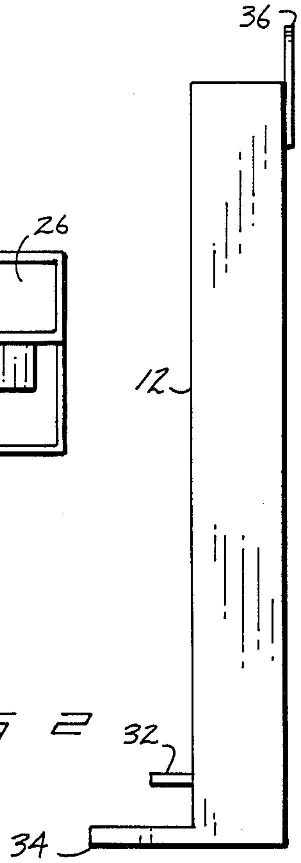
FIG 2
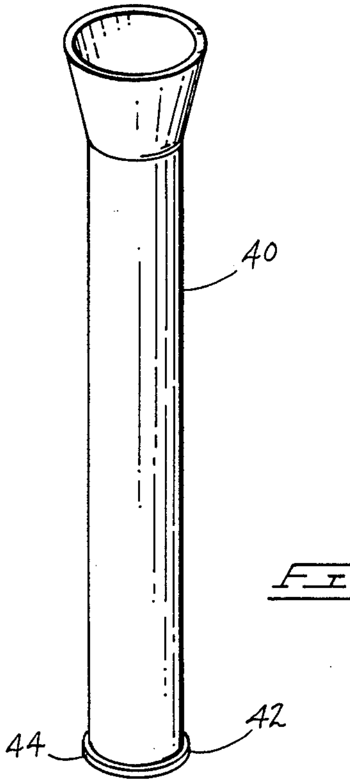
FIG 4
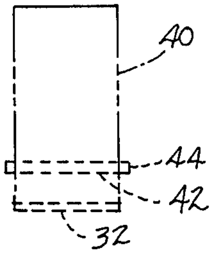
FIG 5

VITAMIN DISPENSER

BACKGROUND OF THE INVENTION

1. Field of the Invention

The present invention relates to dispensing machines, and more particularly pertains to a new and improved dispensing machine which is particularly utilized for the dispensing of vitamins.

2. Description of the Prior Art

The use of dispensing machines for selectively dispensing different types of medicaments and other types of pills is well known in the prior art. Typical examples of such prior art pill dispensing machines are found in U.S. Pat. No. 3,968,900, which issued to B. Stambuk on July 13, 1976; U.S. Pat. No. 4,207,992, which issued to J. Brown on June 17, 1980; and U.S. Pat. No. 4,223,801, which issued to T. Carlson on Sept. 23, 1980. All of these prior art devices are concerned with the automatic timed release of medicaments and other pills. In this respect, these prior art devices are functional for their intended purposes; however, they are not particularly practical for home use inasmuch as they are complex in construction and expensive to manufacture. Further, none of these prior art devices are particularly designed for use as vitamin dispensers, nor is there a need for an automatic timed release function in a vitamin dispenser. As such, there appears to be some need in the prior art for a simple and easy to use vitamin dispenser which can be utilized in a home environment, and in this respect, the present invention addresses this need.

SUMMARY OF THE INVENTION

In view of the foregoing disadvantages inherent in the known types of pill dispensers now present in the prior art, the present invention provides an improved pill dispenser particularly adapted for dispensing selected types of vitamins through a simple manual operation while also providing an indication of when such vitamins should be refilled or taken by the user. As such, the general purpose of the present invention, which will be described subsequently in greater detail, is to provide a new and improved vitamin dispenser which has all the advantages of the prior art pill dispensers and none of the disadvantages.

To attain this, the present invention comprises a rectangularly-shaped manually operable dispenser wherein vitamins are retained within a plurality of slots formed within the dispenser. Each slot is designed to hold a different type of vitamin, and a viewing window over each slot provides an indication as to when a particular vitamin should be replenished within the dispenser. Each slot holds a transparent tubular vial filled with the chosen vitamin, and a pull lever mounted in the dispenser effects a rotatable movement of a swivel disk mounted on the bottom of each vial so as to release a single pill into a holding tray.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pill dispenser which has all the advantages of the prior art pill dispensers and none of the disadvantages.

It is another object of the present invention to provide a new and improved pill dispenser which may be easily and efficiently manufactured and marketed.

It is a further object of the present invention to provide a new and improved pill dispenser which is of a durable and reliable construction.

An even further object of the present invention is to provide a new and improved pill dispenser which is susceptible of a low cost of manufacture with regard to both materials and labor, and which accordingly is then susceptible of low prices of sale to the consuming public, thereby making such pill dispensers economically available to the buying public.

Still yet another object of the present invention is to provide a new and improved pill dispenser which provides in the apparatuses and methods of the prior art some of the advantages thereof, while simultaneously overcoming some of the disadvantages normally associated therewith.

Still another object of the present invention is to provide a new and improved pill dispenser which is particularly adapted for home use.

Yet another object of the present invention is to provide a new and improved pill dispenser which is designed to selectively and easily dispense different types of vitamins.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevation view of the invention.

FIG. 3 is a top plan view of the invention.

FIG. 4 is a perspective view of a vitamin pill holding vial used in the combination of the present invention.

FIG. 5 is an orthographic view taken in elevation illustrating a pull lever in contact with a pivotally displaceable disk.

DESCRIPTION OF THE PREFERRED EMBODIMENT

Figure 1:
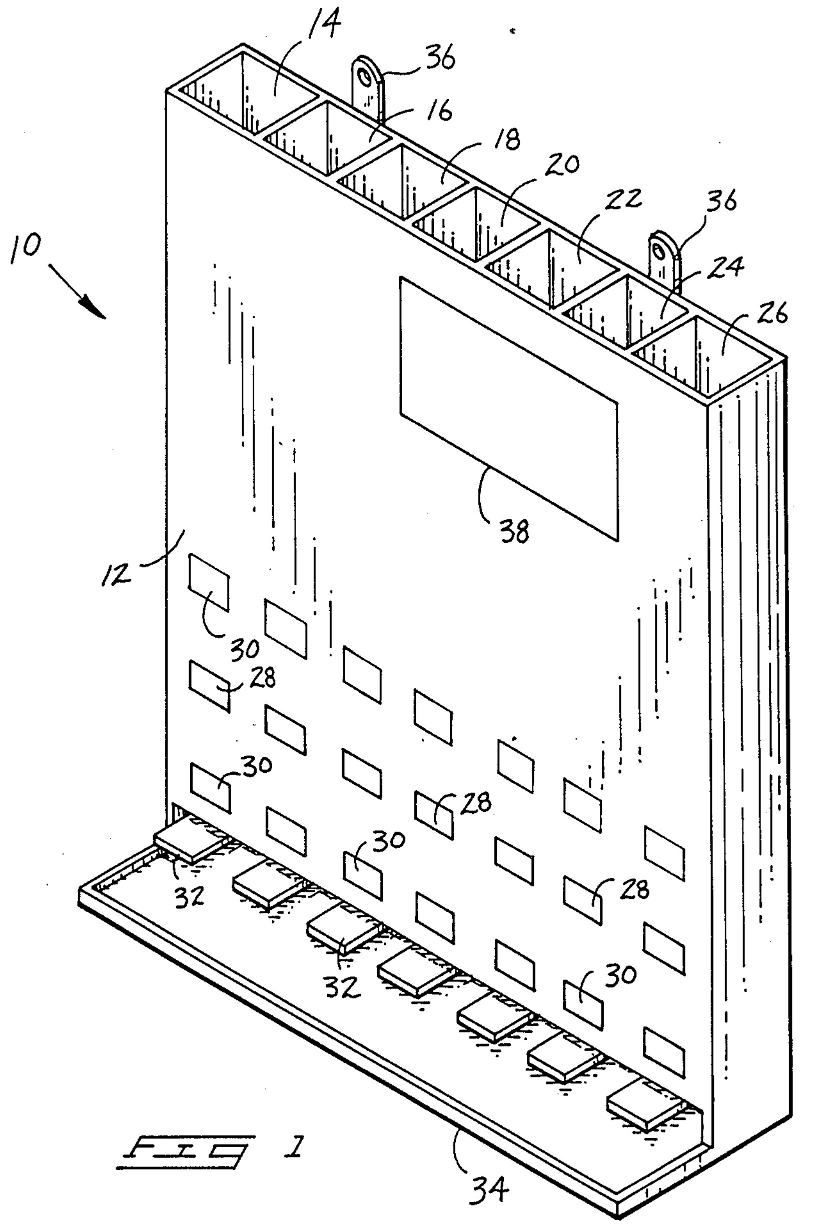
FIG. 1 is a perspective view of the vitamin dispenser comprising the present invention.

With reference now to the drawings, and in particular to FIGS. 1, 2 and 3 thereof, a new and improved vitamin pill dispenser embodying the principles and concepts of the present invention and generally designated by the reference numeral 10 will be described.

More specifically, it will be noted that the dispenser 10 essentially comprises a rectangularly-shaped housing 12 having a plurality of elongated slots 14–26 formed therein. Each of the slots 14–26 is designed to retain a different type of vitamin, and a plurality of transparent viewing windows, each of which is generally designated by the reference numeral 28, are built into the housing 12 and facilitate a viewing of the contents of the particular slot over which each window is positioned. Additionally, each of the slots 14–26 will have 2 sets of tag 30 positioned beneath a viewing window 28. These tags 30 are representative of a plurality of tags which could be used in conjunction with each of the slots 14–26, with such tags being utilized to describe the contents of a particular slot 14–26, to indicate the time of day the vitamin in a particular slot should be taken, etc.

As further illustrated in the drawings, each of the slots 14–26 has a pull lever, generally designated by the reference numeral 32, associated therewith, with these levers being actuable to effect a release of a vitamin pill out of a particular slot into a holding tray 34 formed on a bottom portion of the housing 12. Further noteworthy features of the invention shown in FIGS. 1, 2 and 3 include hinge hooks 36 to facilitate a hanging of the housing 12 on a wall, and a personalized name plate 38 which can be attached to the housing to indicate which particular individual utilizes the vitamins in a particular dispenser 10.

FIG. 4 of the drawings illustrates a tubular shaped transparent vial 40 which could be made out of glass, plastic, or some other transparent material. Each vial 40 is designed to hold a particular type of vitamin and can be inserted in a chosen slot 14–26 to be permanently retained therein until all of the vitamins in the vial are dispensed. A vial 40 could be provided with an unillustrated snap-on cap to protect the vitamins contained therein, while the bottom of each vial could be provided with a swivelly mounted, permanently attached disk 42. Each disk 42 would be retained in place by a small spring against a hinge assembly 44. When inserted into one of the slots 14–26, the swivel plate 42 associated with a particular vial 40 would engage a pull lever 32. In this regards, each pull lever 32 would be of an L-shape with an upward lip portion being contained within the housing 12 and being engagable with the swivel disk 42. As such, a pull on a particular lever 32 would result in a swivel movement of a disk 42, thereby to facilitate the release of a single vitamin pill out of a vial 40, whereby the pill would drop into the holding tray 34. Of course, the contents of a vial 40 could be monitored through one of the viewing windows 28 and when the contents dropped below visual sight in a particular windown, a user of the dispenser 10 would know that it is time to refill the particular vial.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. a new and improved pill dispenser comprising:

housing means including pill holding tray means formed in said housing means;

an aligned plurality of pill holding slots formed in said housing means including a plurality of transparent vials positionable in each of said pill holding slots further including individual transparent slot viewing means in said housing aligned with each of said transparent vials for determining a quantity of pills in said slots;

and manually operable pill dispensing means including a plurality of "L" shaped pull levers associated with said pill holding slots including a first planar outwardly directed leg positioned exteriorly of said housing for accepting a manual application of force, and a second upwardly directed leg integrally formed to said first planar outwardly directed leg, and each of said transparent vials are further formed as an elongate tubular portion with a pill directing funnel integrally formed to each upper terminal end of each elongate tubular portion with swivel disks pivotally secured to bottom portions thereof, said swivel disks being rotatable to effect a release of pills from said vials, and spring biased in a first position to close each elongate tubular portion and pivotal to a second position outwardly of each tubular portion to effect release of pills within said tubular portion, and said pull levers arranged to engage said disks with said second upwardly directed leg for displacement of said disks to said second position to effect release of pills, and said pill holding tray means including an elongate planar surface in underlying and outwardly projecting relationship to said plurality of pill holding slots and said pull levers with said pill holder tray means further including an upstanding continuous rim at a terminal border of said planar surface integrally formed to said housing means;

and at least one information tag positioned on said housing aligned with each of said transparent slot viewing means for providing information to medically describe pills contained within each of said transparent vials, and a plurality of hooks secured in said housing rearwardly of said slots to enable elevated hanging of said dispenser to a vertical support surface

* * * * *